(12) United States Patent
Xie et al.

(10) Patent No.: US 11,385,748 B2
(45) Date of Patent: Jul. 12, 2022

(54) TOUCH SUBSTRATE, TOUCH CONTROL DISPLAY PANEL, AND METHOD OF FABRICATING TOUCH SUBSTRATE

(71) Applicants: BOE TECHNOLOGY GROUP CO., LTD., Beijing (CN); Hefei Xinsheng Optoelectronics Technology Co., Ltd., Anhui (CN)

(72) Inventors: Xiaodong Xie, Beijing (CN); Tsungchieh Kuo, Beijing (CN); Ming Zhang, Beijing (CN); Jing Wang, Beijing (CN); Xinbin Tian, Beijing (CN); Qitao Zheng, Beijing (CN)

(73) Assignees: BOE TECHNOLOGY GROUP CO., LTD., Beijing (CN); Hefei Xinsheng Optoelectronics Technology Co., Ltd., Anhui (CN)

( * ) Notice: Subject to any disclaimer, the term of this patent is extended or adjusted under 35 U.S.C. 154(b) by 826 days.

(21) Appl. No.: 16/065,023

(22) PCT Filed: Jun. 15, 2017

(86) PCT No.: PCT/CN2017/088434
§ 371 (c)(1),
(2) Date: Jun. 21, 2018

(87) PCT Pub. No.: WO2018/227470
PCT Pub. Date: Dec. 20, 2018

(65) Prior Publication Data
US 2021/0208735 A1    Jul. 8, 2021

(51) Int. Cl.
*G06F 3/044* (2006.01)
(52) U.S. Cl.
CPC .......... *G06F 3/0445* (2019.05); *G06F 3/0446* (2019.05); *G06F 2203/04103* (2013.01)

(58) Field of Classification Search
CPC ................. G06F 3/0446; G06F 3/0445; G06F 2203/04103; G06F 2203/04112
See application file for complete search history.

(56) References Cited

U.S. PATENT DOCUMENTS

| | | | |
|---|---|---|---|
| 2011/0062146 A1* | 3/2011 | Kuriki | H05B 3/84 |
| | | | 219/553 |
| 2011/0102361 A1* | 5/2011 | Philipp | G02F 1/13439 |
| | | | 345/174 |

(Continued)

FOREIGN PATENT DOCUMENTS

| | | |
|---|---|---|
| CN | 105190503 A | 12/2015 |
| CN | 105511664 A | 4/2016 |

(Continued)

OTHER PUBLICATIONS

International Search Report & Written Opinion dated Mar. 14, 2018, regarding PCT/CN2017/088434.

(Continued)

*Primary Examiner* — Md Saiful A Siddiqui
(74) *Attorney, Agent, or Firm* — Intellectual Valley Law, P.C.

(57) ABSTRACT

The present application discloses a touch substrate. The touch substrate includes a base substrate, and a first mesh electrode layer having a plurality of first mesh electrodes on the base substrate. The plurality of first mesh electrodes are arranged substantially along a first direction. Each of the plurality of first mesh electrodes extends substantially along a second direction. Each of the plurality of first mesh electrodes includes a plurality of first portions having a zig zag contour, a midline of each of the plurality of first portions being a zig zag line.

19 Claims, 14 Drawing Sheets

(56) References Cited

U.S. PATENT DOCUMENTS

| | | | |
|---|---|---|---|
| 2015/0109245 A1* | 4/2015 | Chou | G06F 3/0446 345/174 |
| 2016/0004365 A1* | 1/2016 | Huang | G06F 3/0446 29/830 |
| 2016/0041644 A1* | 2/2016 | Bae | G06F 3/0443 345/174 |
| 2016/0091998 A1* | 3/2016 | Chyan | G06F 3/04883 345/174 |
| 2016/0103517 A1 | 4/2016 | Kang et al. | |
| 2016/0103526 A1* | 4/2016 | Sohn | G06F 3/0445 345/174 |
| 2016/0154517 A1 | 6/2016 | Ullmann et al. | |
| 2016/0224181 A1* | 8/2016 | Kim | G06F 3/0446 |
| 2016/0370920 A1* | 12/2016 | Fan | G06F 3/0445 |
| 2017/0108964 A1 | 4/2017 | Sato | |
| 2017/0131816 A1 | 5/2017 | Zou et al. | |
| 2017/0153726 A1 | 6/2017 | Lee et al. | |
| 2017/0255316 A1* | 9/2017 | Tahara | G06F 3/0446 |

FOREIGN PATENT DOCUMENTS

| | | |
|---|---|---|
| CN | 106383621 A | 2/2017 |
| CN | 206058156 U | 3/2017 |
| CN | 106681561 A | 5/2017 |
| JP | 2016015013 A | 1/2016 |
| JP | 2017-182213 | * 10/2017 |

OTHER PUBLICATIONS

The Extended European Search Report in the European Patent Application No. 17894665.3, dated Nov. 4, 2020.

* cited by examiner

TOUCH SUBSTRATE, TOUCH CONTROL DISPLAY PANEL, AND METHOD OF FABRICATING TOUCH SUBSTRATE

CROSS-REFERENCE TO RELATED APPLICATION

This application is a national stage application under 35 U.S.C. § 371 of International Application No. PCT/CN2017/088434, filed Jun. 15, 2017, the contents of which are incorporated by reference in the entirety.

TECHNICAL FIELD

The present invention relates to display technology, more particularly, to a touch substrate, a touch control display panel, and a method of fabricating a touch substrate.

BACKGROUND

Touch panels having metal mesh electrodes have found a wide range of applications in display field such as mobile phones, computer display panels, touch screens, satellite navigation devices, and digital cameras. For example, a mutual capacitance type touch panel may include a first metal mesh electrode layer and a second metal mesh electrode layer for touch detection. Touch panels having metal mesh electrodes are particularly suitable for use with an active pen.

SUMMARY

In one aspect, the present invention provides a touch substrate comprising a base substrate; and a first mesh electrode layer comprising a plurality of first mesh electrodes on the base substrate, the plurality of first mesh electrodes arranged substantially along a first direction, each of the plurality of first mesh electrodes extending substantially along a second direction; wherein each of the plurality of first mesh electrodes comprises a plurality of first portions having a zig zag contour, a midline of each of the plurality of first portions being a zig zag line.

Optionally, a width substantially along the first direction of each of the plurality of first mesh electrodes varies across its length substantially along the second direction; and each of the plurality of first portions has a width substantially along the first direction smaller than those of its adjacent portions.

Optionally, a width substantially along the first direction of each of the plurality of first mesh electrodes varies across its length substantially along the second direction; and the plurality of first portions are narrowest portions substantially along the first direction of each of the plurality of first mesh electrodes across its length substantially along the second direction.

Optionally, each of the plurality of first mesh electrodes comprises a plurality of strands of wires interconnected at a plurality of first nodes; and each of the plurality of first portions having the zig zag contour comprises at least two first nodes along its width substantially along the first direction.

Optionally, the touch substrate further comprises an insulating layer on a side of the first mesh electrode layer distal to the base substrate; and a second mesh electrode layer on a side of the insulating layer distal to the first mesh electrode layer; wherein the second mesh electrode layer comprising a plurality of second mesh electrodes, the plurality of second mesh electrodes arranged substantially along a third direction, each of the plurality of second mesh electrodes extending substantially along a fourth direction; and the plurality of first mesh electrodes and the plurality of second mesh electrodes cross over each other forming a plurality of intersections, projections of the plurality of first mesh electrodes and the plurality of second mesh electrodes on the base substrate overlapping with each other in the plurality of intersections.

Optionally, each of the plurality of first portions comprises at least a part in one of the plurality of intersections.

Optionally, the first direction is substantially perpendicular to the third direction, and the second direction is substantially perpendicular to the fourth direction.

Optionally, each of the plurality of second mesh electrodes comprises a plurality of second portions having a zig zag contour, a midline of each of the plurality of second portions being a zig zag line.

Optionally, a width substantially along the third direction of each of the plurality of second mesh electrodes varies across its length substantially along the fourth direction; and each of the plurality of second portions has a width substantially along the third direction smaller than those of its adjacent portions.

Optionally, a width substantially along the third direction of each of the plurality of second mesh electrodes varies across its length substantially along the fourth direction; and the plurality of second portions are narrowest portions substantially along the third direction of each of the plurality of second mesh electrodes across its length substantially along the fourth direction.

Optionally, each of the plurality of second mesh electrodes comprises a plurality of strands of wires interconnected at a plurality of second nodes; and each of the plurality of second portions having the zig zag contour comprises at least two second nodes along its width substantially along the third direction.

Optionally, each of the plurality of second portions comprises at least a part in one of the plurality of intersections.

In another aspect, the present invention provides a touch control display panel comprising a touch substrate described herein.

In another aspect, the present invention provides a method of fabricating a touch substrate, comprising forming a first initial mesh electrode layer on a base substrate; and patterning the first initial mesh electrode layer using a first mask plate to form a first mesh electrode layer comprising a plurality of first mesh electrodes; wherein the first mask plate comprising a plurality of first lightproof regions corresponding to the plurality of first mesh electrodes, the plurality of first lightproof regions arranged substantially along a first direction, each of the plurality of first lightproof regions extending substantially along a second direction; and each of the plurality of first lightproof regions comprises a plurality of first zig zag portions, a midline of each of the plurality of first zig zag portions being a zig zag line.

Optionally, a width substantially along the first direction of each of the plurality of first lightproof regions varies across its length substantially along the second direction; and each of the plurality of first zig zag portions has a width substantially along the first direction smaller than those of its adjacent portions.

Optionally, each of the plurality of first mesh electrodes is formed to comprise a plurality of strands of wires interconnected at a plurality of first nodes; and the width of each of the plurality of first zig zag portions substantially along the first direction is defined so that the first mesh electrode layer comprises at least two first nodes substantially along the first direction in areas corresponding to each of the plurality of first zig zag portions.

Optionally, the method further comprises forming an insulating layer on a side of the first mesh electrode layer distal to the base substrate; forming a second initial mesh electrode layer on a side of the insulating layer distal to the first mesh electrode layer; and patterning the second initial mesh electrode layer using a second mask plate to form a second mesh electrode layer comprising a plurality of second mesh electrodes; wherein the second mask plate comprising a plurality of second lightproof regions corresponding to the plurality of second mesh electrodes, the plurality of second lightproof regions arranged substantially along a third direction, each of the plurality of second lightproof regions extending substantially along a fourth direction; and each of the plurality of second lightproof regions comprises a plurality of second zig zag portions, a midline of each of the plurality of second zig zag portions being a zig zag line.

Optionally, a width substantially along the third direction of each of the plurality of second lightproof regions varies across its length substantially along the fourth direction; and each of the plurality of second zig zag portions has a width substantially along the third direction smaller than those of its adjacent portions.

Optionally, each of the plurality of second mesh electrodes is formed to comprise a plurality of strands of wires interconnected at a plurality of second nodes; and the width of each of the plurality of second zig zag portions substantially along the third direction is defined so that the second mesh electrode layer comprises at least two second nodes substantially along the third direction in areas corresponding to each of the plurality of second zig zag portions.

Optionally, the plurality of first mesh electrodes and the plurality of second mesh electrodes are formed to cross over each other forming a plurality of intersections, projections of the plurality of first mesh electrodes and the plurality of second mesh electrodes on the base substrate overlapping with each other in the plurality of intersections; a projection of each of the plurality of first zig zag portions on the base substrate covers that of one of the plurality of intersections; and a projection of each of the plurality of second zig zag portions on the base substrate covers that of one of the plurality of intersections.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

In conventional mesh electrode touch substrate, a plurality of mesh electrodes are formed as conductive channels for transmitting touch signals, e.g., touch scanning signals and touch sensing signals. Distances between conductive channels are designed so that a good touch control and touch accuracy may be achieved. When the distances between the conductive channels are too large, the resistance of the mesh electrodes (i.e., the conductive channels) may be too high, affecting touch detection. On the other hand, when the distances between the conductive channels are too small, linear stretches of horizontal or vertical boundaries of mesh electrodes may have interference with the display module, resulting in Moiré patterns. Moreover, when the distances between the conductive channels are too small, the overall capacitance of the mesh electrodes may become too large, thus affecting the touch detection accuracy. Particularly, a mutual capacitance type touch substrate includes a plurality of intersection areas where a plurality of mesh electrodes in a first mesh electrode layer and a plurality of mesh electrodes in a second mesh electrode layer cross over each other. The width of the conductive channels in the intersection areas is made small in order to reduce the overall capacitance of the touch substrate. To achieve a satisfactory touch accuracy, the portions of the conductive channels in the intersection areas are typically the narrowest portions of the mesh electrode layers. When the conductive channels are made narrow, the resistance of the conductive channels increases, affecting touch detection.

Figure 1A:
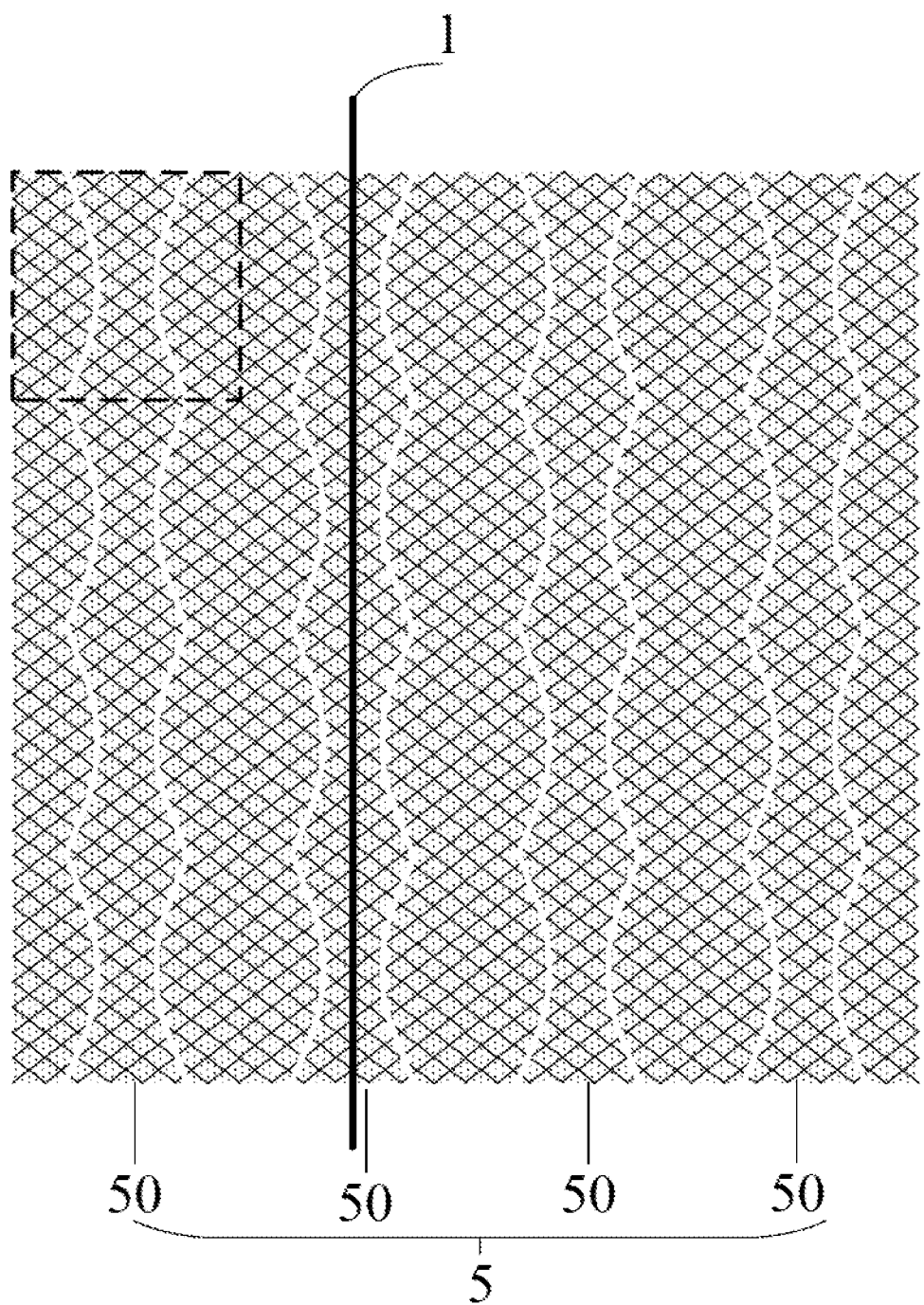
FIG. 1A is a schematic diagram illustrating the structure of a conventional touch substrate.
Figure 1B:
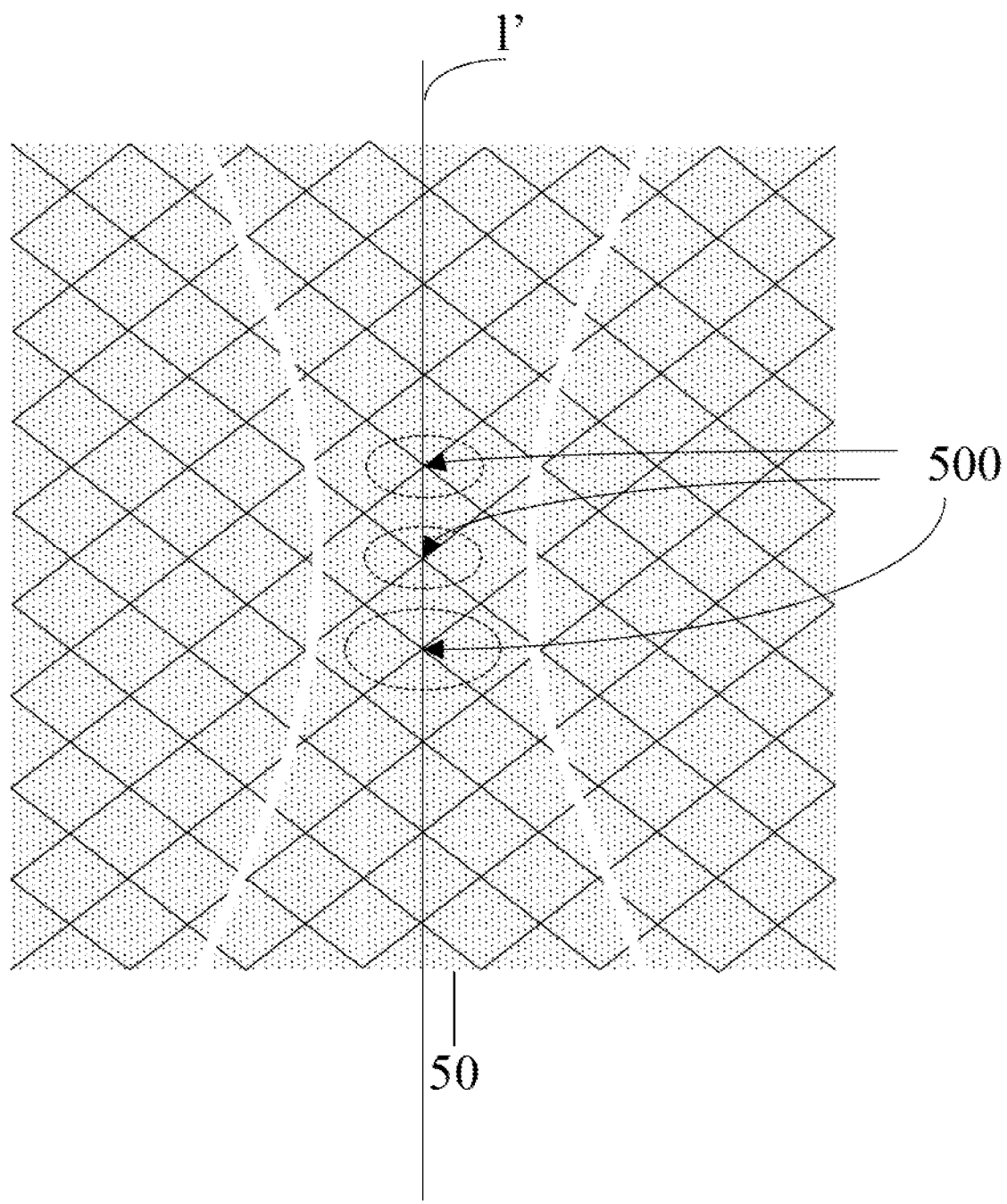
FIG. 1B is a zoom-in view of an area encircled by dotted lines in FIG. 1A.

FIG. 1A is a schematic diagram illustrating the structure of a conventional touch substrate. FIG. 1B is a zoom-in view of an area encircled by dotted lines in FIG. 1A. Referring to FIG. 1A and FIG. 1B, the conventional touch substrate includes a mesh electrode layer 5 having a plurality of mesh electrodes 50. The plurality of mesh electrodes 50 have a smooth, curved boundary. A midline l of each of the plurality of mesh electrodes 50 is substantially a straight line throughout its length direction. Referring to FIG. 1B, a narrowest portion of one of the plurality of mesh electrodes 50 is shown. The midline l' of the narrowest portion substantially overlaps with the midline l of one of the plurality of mesh electrodes 50, and the midline l' of the narrowest portion is also a substantially straight line. The narrowest portion is typically where mesh electrodes in two electrode layers cross over each other. As discussed above, the narrowest portion is typically made to have a small width in order to reduce the overall capacitance of the touch substrate. To achieve a required touch accuracy, as shown in FIG. 1B, the narrowest portion of the conductive channel often includes only one node of the mesh electrode wire along the width direction. As shown in FIG. 1B, the narrowest portion includes a conductive channel formed by three single nodes 500 continuously along the length direction of the mesh electrode, significantly increasing the resistance of the mesh electrode and adversely affecting touch detection.

Accordingly, the present disclosure provides, inter alia, a touch substrate, a touch control display panel, and a method of fabricating a touch substrate that substantially obviate one or more of the problems due to limitations and disadvantages of the related art. In one aspect, the present disclosure provides a touch substrate. In some embodiments, the touch substrate includes a base substrate and a first mesh electrode layer having a plurality of first mesh electrodes on the base substrate. The plurality of first mesh electrodes are arranged substantially along a first direction, and each of the plurality of first mesh electrodes extends substantially along a second direction. Optionally, each of the plurality of first mesh electrodes includes a plurality of first portions having a zig zag contour. Optionally, a midline of each of the plurality of first portions being a zig zag line. As used herein, the term "contour" refers to an outline by connecting adjacent end points of strands of mesh electrodes.

Figure 2:
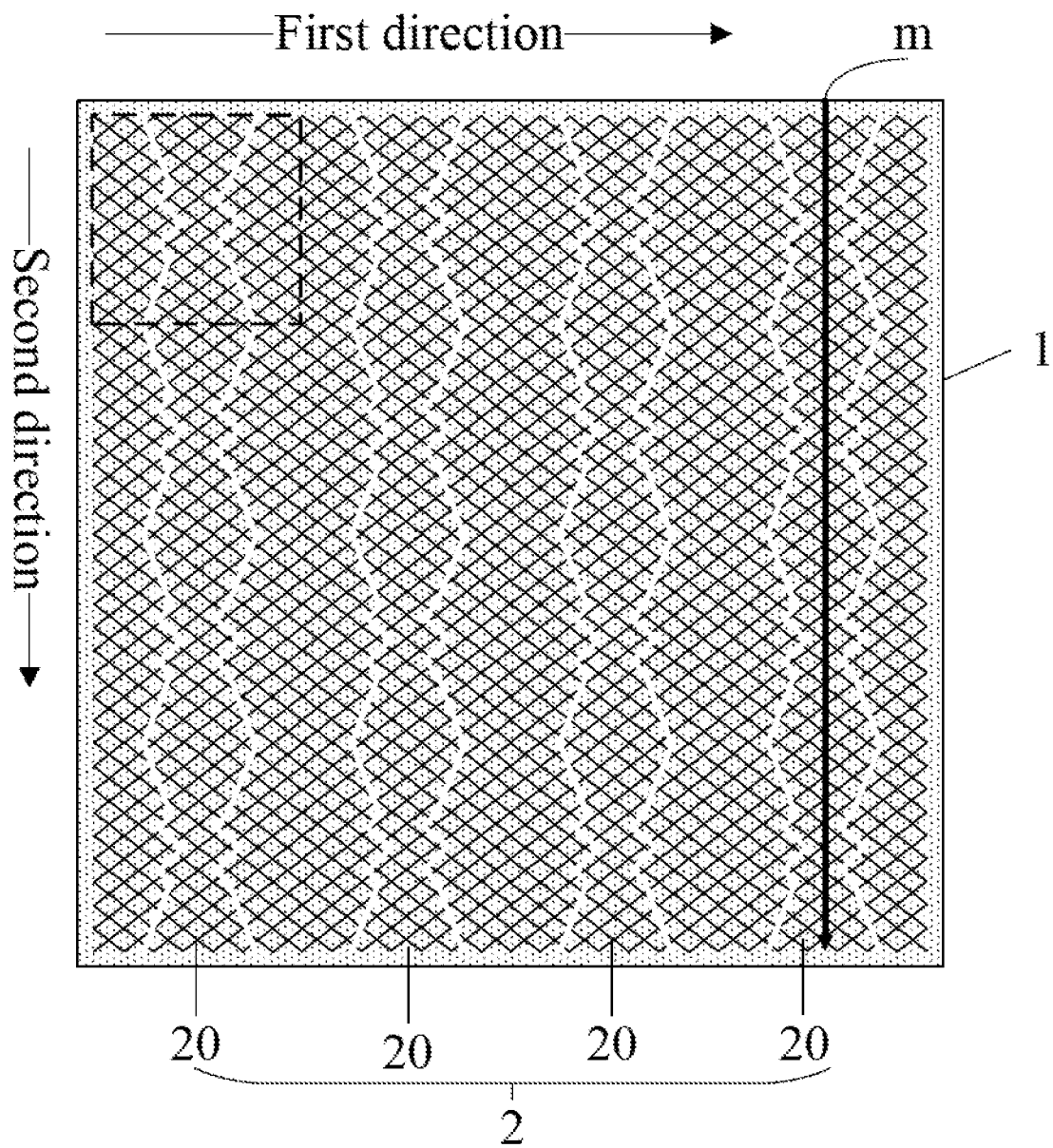
FIG. 2 is a schematic diagram illustrating the structure of a touch substrate in some embodiments according to the present disclosure.
Figure 3:
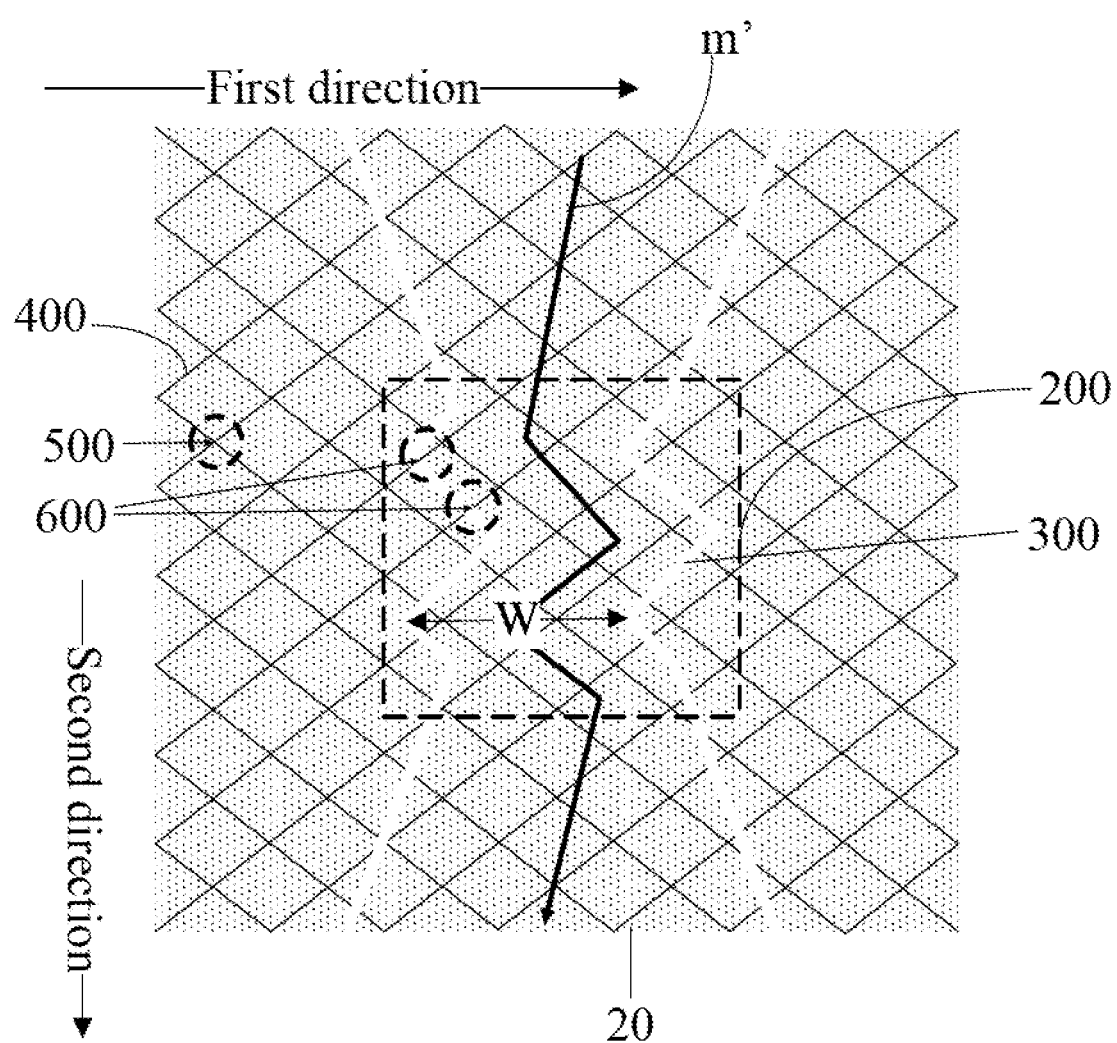
FIG. 3 is a zoom-in view of an area encircled by dotted lines in FIG. 2.

FIG. 2 is a schematic diagram of the structure of a touch substrate in some embodiments according to the present disclosure. FIG. 3 is a zoom-in view of an area encircled by dotted lines in FIG. 2. Referring to FIG. 2, the touch substrate in some embodiments includes a base substrate 1, and a first mesh electrode layer 2 including a plurality of first mesh electrodes 20 on the base substrate 1. The plurality of first mesh electrodes 20 are arranged substantially along a first direction. Each of the plurality of first mesh electrodes 20 extends substantially along a second direction, i.e., the overall extending direction of each of the plurality of first mesh electrodes 20 in some embodiments is along a straight line substantially along the second direction. In FIG. 2, an arrow line m is shown to denote the overall extending direction of a midline of one of the plurality of first mesh electrodes 20. As shown in FIG. 2, the overall extending direction of the midline is a straight line substantially along the second direction. Optionally, the first direction is substantially perpendicular to the second direction.

Figure 4:
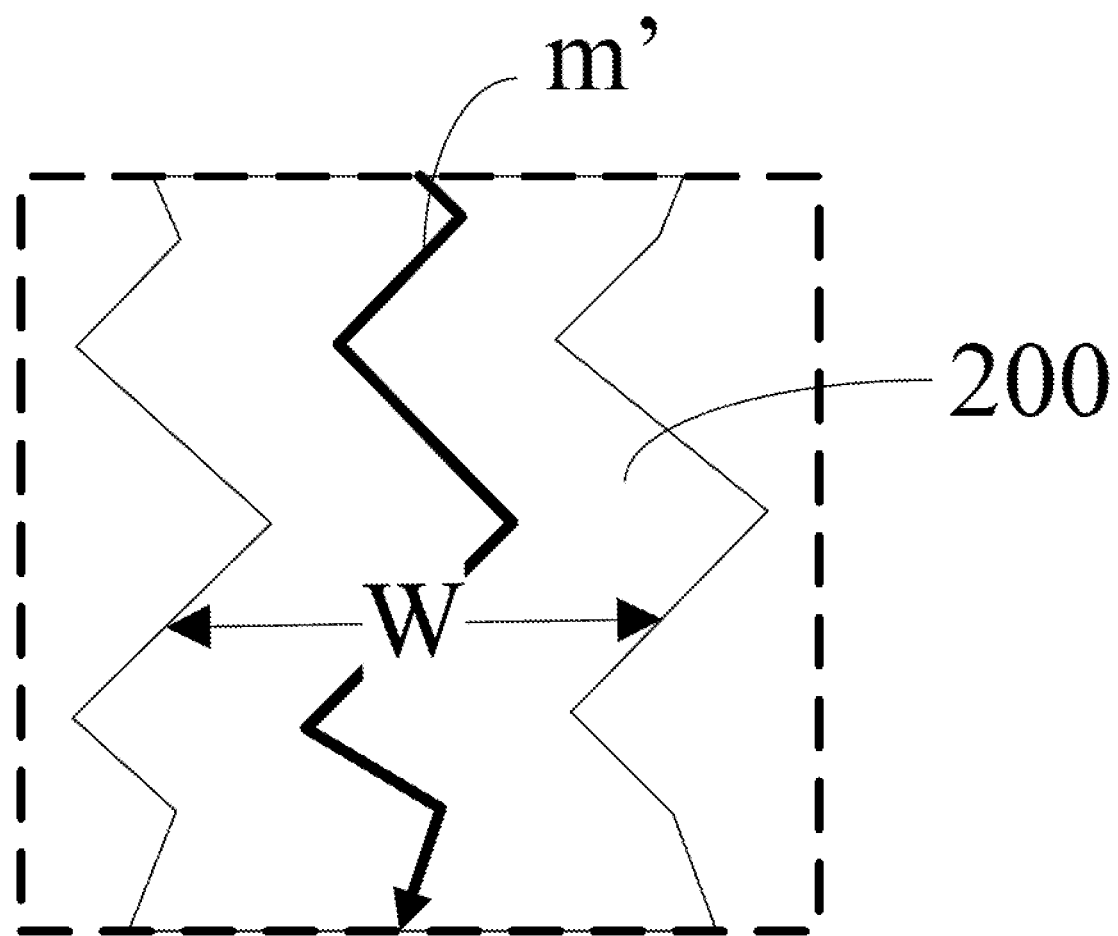
FIG. 4 is a schematic diagram illustrating the structure of a first portion having a zig zag contour in some embodiments according to the present disclosure.

Referring to FIG. 2 and FIG. 3, in some embodiments, each of the plurality of first mesh electrodes 20 includes a plurality of first portions 200 having zig zag contour. As shown in FIG. 3, a contour line 300 defines the contour of each of the plurality of first portions 200. In some embodiments, each of the plurality of first mesh electrodes 20 includes a plurality of strands of wires 400 interconnected at a plurality of first nodes 500. Each of the plurality of first mesh electrodes 20 includes, along its boundary, a plurality of end points 600 of the strands of wires. In some embodiments, the contour line 300 is defined by connecting adjacent end points of the plurality of end points 600. FIG. 4 is a schematic diagram illustrating the structure of a first portion having a zig zag contour in some embodiments according to the present disclosure. Referring to FIG. 3 and FIG. 4, each of the plurality of first portions 200 has a zig zag contour, and a midline m' of each of the plurality of first portions 200 is a zig zag line. Other portions of each of the plurality of first mesh electrodes 20 (outside the plurality of first portions 200) do not have a zig zag contour. As shown in FIG. 2, the midline in of other portions of each of the plurality of first mesh electrodes 20 (outside the plurality of first portions 200) is substantially a straight line.

Referring to FIG. 3 and FIG. 4, a width W substantially along the first direction of each of the plurality of first mesh electrodes 20 varies across its length substantially along the second direction. Each of the plurality of first portions 200 has a width W substantially along the first direction smaller than those of its adjacent portions. Optionally, the plurality of first portions 200 are narrowest portions substantially along the first direction of each of the plurality of first mesh electrodes 20 across its length substantially along the second direction, as illustrated in FIG. 2 and FIG. 3.

By having as zig zag contour, each of the plurality of first portions 200 includes at least two first nodes 500 along its width substantially along the first direction. The conventional touch substrates do not include a portion having as zig zag contour, as discussed above, the narrowest portion of the mesh electrodes in the conventional touch substrates often includes only one node, leading to an increase resistance. As compared to the conventional touch substrates, the present touch substrate includes at least two first nodes 500 even in its narrowest portions, resulting in a decreased resistance and much enhanced touch accuracy.

Figure 5:
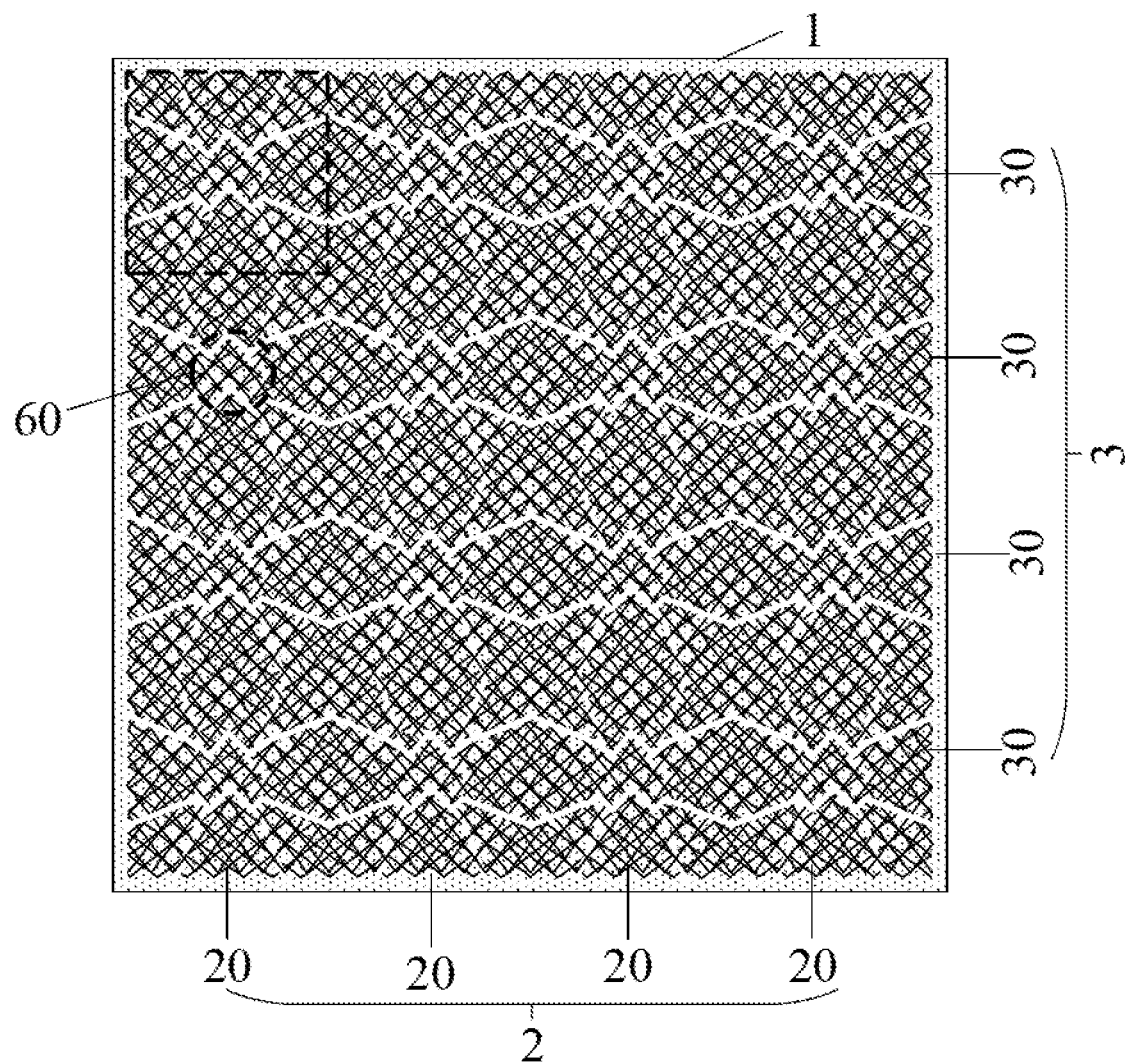
FIG. 5 is a schematic diagram illustrating the structure of a touch substrate in some embodiments according to the present disclosure.
Figure 6:
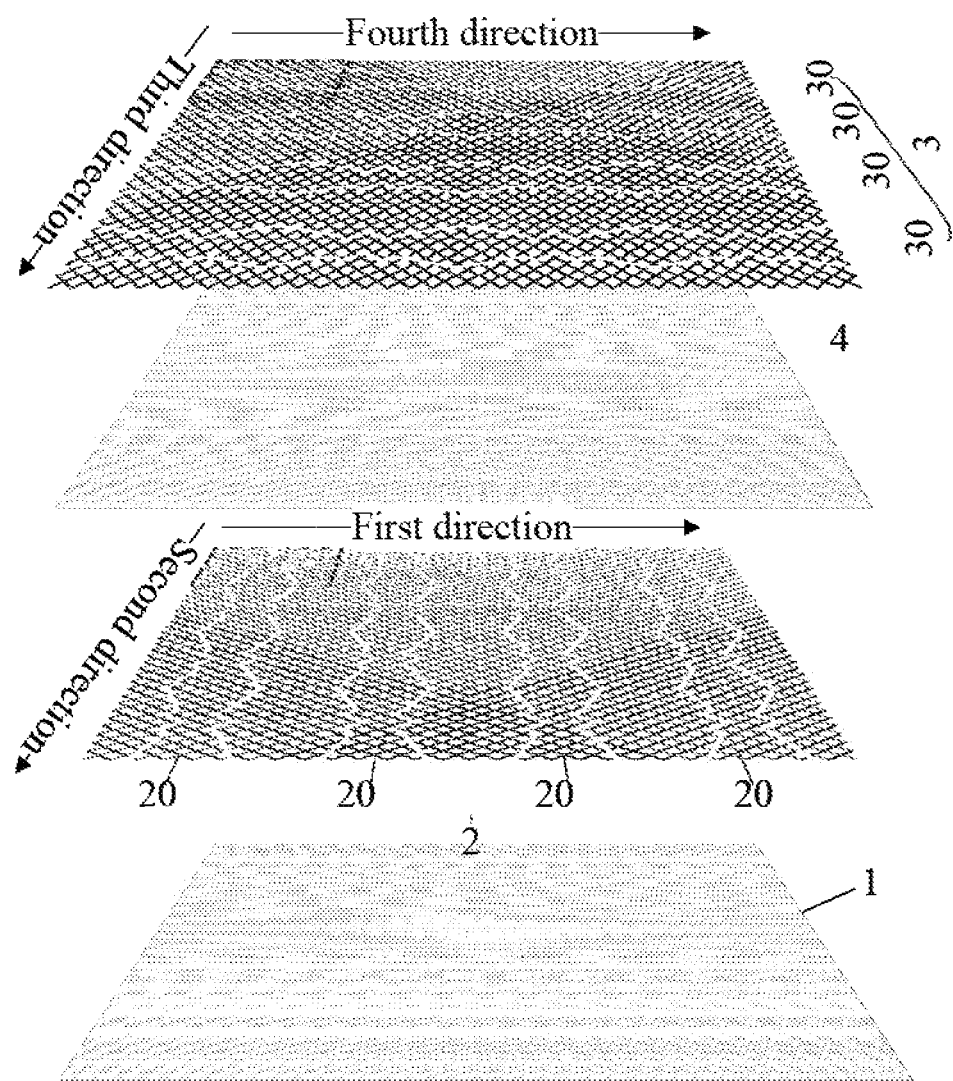
FIG. 6 is a perspective view of the touch substrate of FIG. 5.

In some embodiments, the touch substrate is a mutual capacitance type touch substrate including a first mesh electrode layer and a second mesh electrode layer insulating from the first mesh electrode layer by an insulating layer. FIG. 5 is a schematic diagram illustrating the structure of a touch substrate in some embodiments according to the present disclosure. FIG. 6 is a perspective view of the touch substrate of FIG. 5. Referring to FIG. 5 and FIG. 6, the touch substrate in some embodiments includes a base substrate 1, a first mesh electrode layer 2 including a plurality of first mesh electrodes 20 on the base substrate 1, an insulating layer 4 on a side of the first mesh electrode layer 2 distal to the base substrate 1, and a second mesh electrode layer 3 including a plurality of second mesh electrodes 30 on a side of the insulating layer 4 distal to the first mesh electrode layer 2. The plurality of first mesh electrodes 20 and the plurality of second mesh electrodes 30 cross over each other forming a plurality of intersections 60, projections of the plurality of first mesh electrodes 20 and the plurality of second mesh electrodes 30 on the base substrate 1 overlap with each other in the plurality of intersections 60. Optionally, each of the plurality of first portions 200 includes at least a part in one of the plurality of intersections 60.

Figure 7:
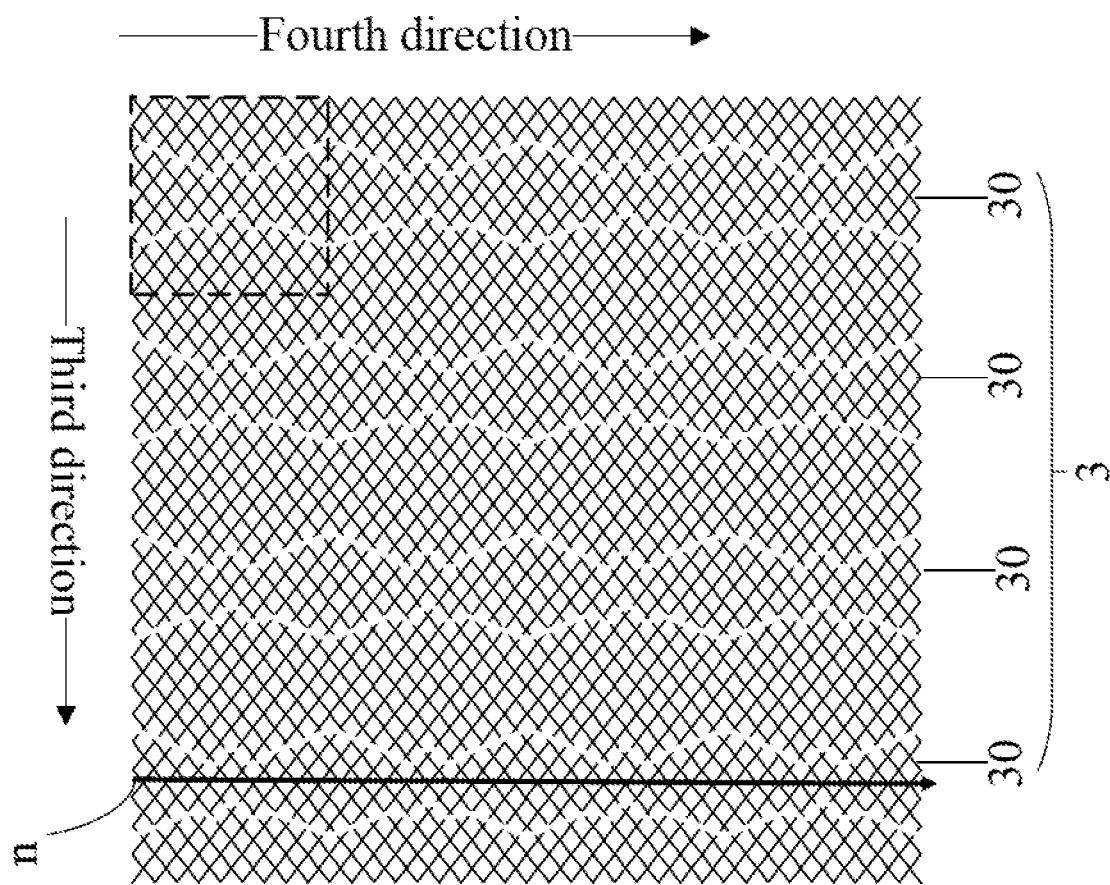
FIG. 7 is a schematic diagram illustrating the structure of a second mesh electrode layer in some embodiments according to the present disclosure.

FIG. 7 is a schematic diagram illustrating the structure of a second mesh electrode layer in some embodiments according to the present disclosure. Referring to FIG. 7, the plurality of second mesh electrodes 30 in some embodiments are arranged substantially along a third direction, each of the plurality of second mesh electrodes 30 extends substantially along a fourth direction, i.e., the overall extending direction of each of the plurality of second mesh electrodes 30 in some embodiments is along a straight line substantially along the fourth direction. In FIG. 7, an arrow line n is shown to denote the overall extending direction of a midline of one of the plurality of second mesh electrodes 30. As shown in FIG. 7, the overall extending direction of the midline is a straight line substantially along the fourth direction. Optionally, the third direction is substantially perpendicular to the fourth direction.

Optionally, the third direction is substantially perpendicular to the first direction. Optionally, the third direction is substantially parallel to the second direction. Optionally, the fourth direction is substantially perpendicular to the second direction. Optionally, the fourth direction is substantially parallel to the first direction.

Figure 8:
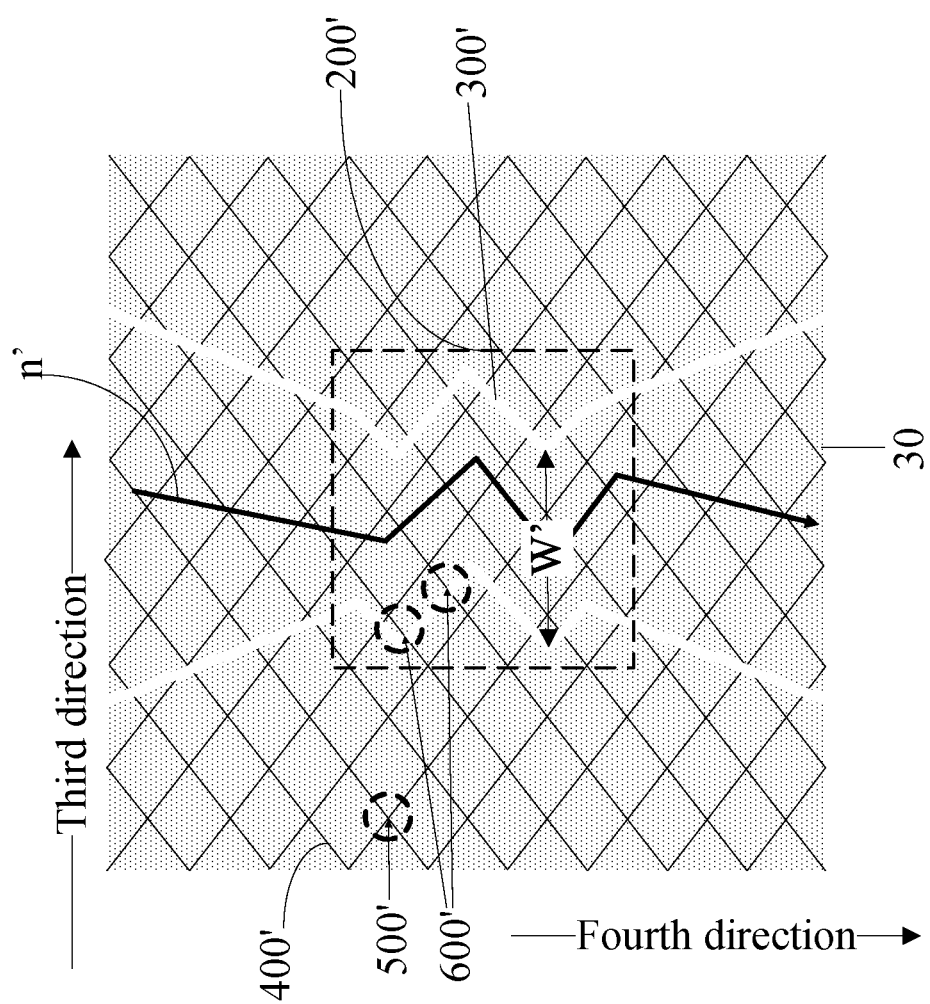
FIG. 8 is a zoom-in view of an area encircled by dotted lines in FIG. 7.
Figure 9:
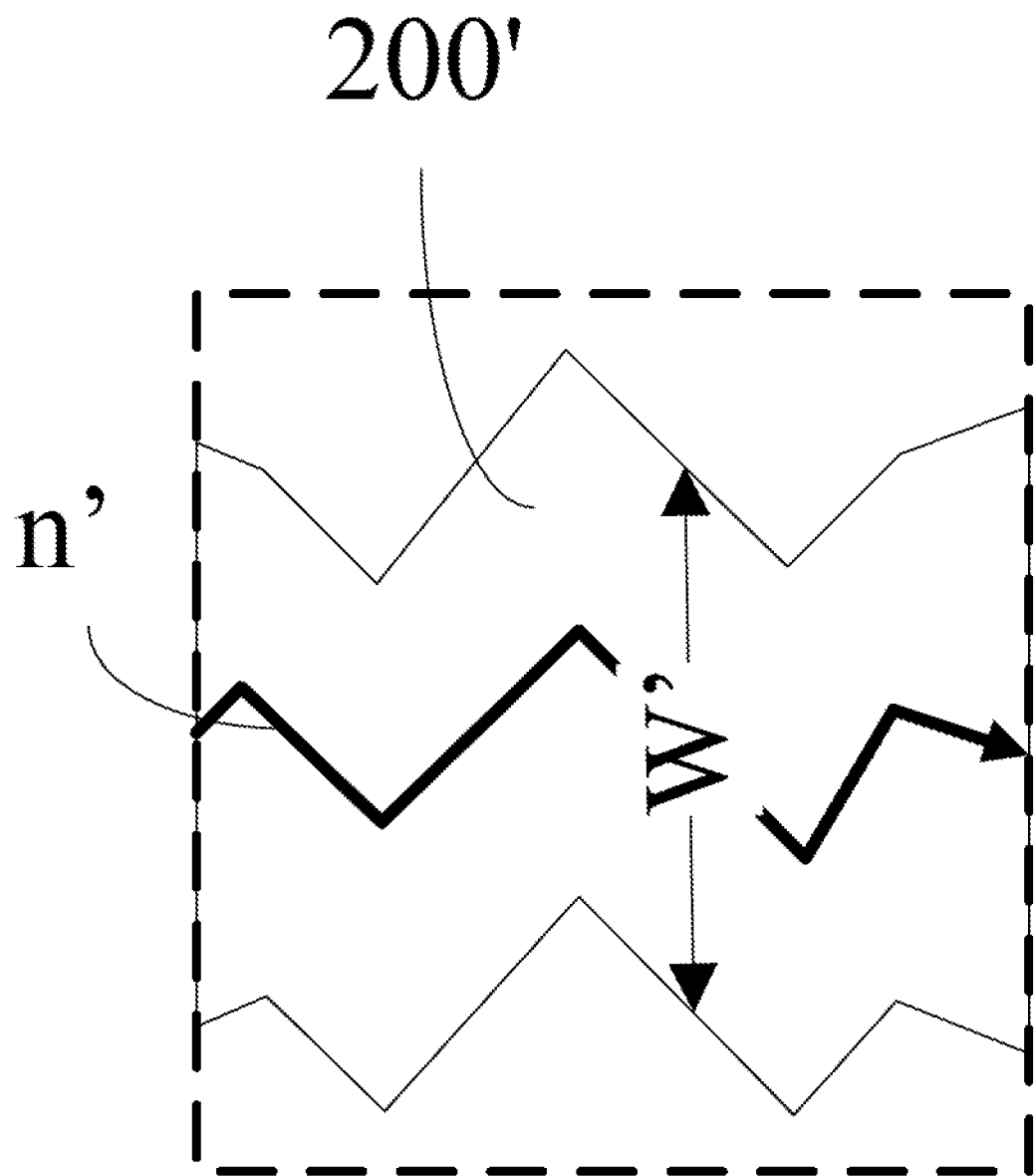
FIG. 9 is a schematic diagram illustrating the structure of a second portion having a zig zag contour in some embodiments according to the present disclosure.

FIG. 8 is a zoom-in view of an area encircled by dotted lines in FIG. 7. Referring to FIG. 7 and FIG. 8, in some embodiments, each of the plurality of second mesh electrodes 30 includes a plurality of second portions 200' having a zig zag contour. As shown in FIG. 8, a contour line 300' defines the contour of each of the plurality of second portions 200'. In some embodiments, each of the plurality of second mesh electrodes 30 includes a plurality of strands of wires 400' interconnected at a plurality of second nodes 500'. Each of the plurality of second mesh electrodes 30 includes, along its boundary, a plurality of end points 600' of the strands of wires 400'. In some embodiments, the contour line is defined by connecting adjacent end points of the plurality of end points 600'. FIG. 9 is a schematic diagram illustrating the structure of a second portion having a zig zag contour in some embodiments according to the present disclosure. Referring to FIG. 8 and FIG. 9, each of the plurality of second portions 200' has a zig zag contour, and a midline n' of each of the plurality of second portions 200' is a zig zag line. Other portions of each of the plurality of second mesh electrodes 30 (outside the plurality of second portions 200') do not have a zig zag contour. As shown in FIG. 7, the midline n of other portions of each of the plurality of second mesh electrodes 30 (outside the plurality of second portions 200') is substantially a straight line.

Optionally, each of the plurality of second portions 200' includes at least a part in one of the plurality of intersections 60.

Referring to FIG. 8 and FIG. 9, a width W' substantially along the third direction of each of the plurality of second mesh electrodes 30 varies across its length substantially along the fourth direction. Each of the plurality of second mesh portions 200' has a width W' substantially along the third direction smaller than those of its adjacent portions. Optionally, the plurality of second portions 200' are narrowest portions substantially along the third direction of each of the plurality of second mesh electrodes 30 across its length substantially along the fourth direction, as illustrated in FIG. 8 and FIG. 9.

By having a zig zag contour, each of the plurality of second portions 200' includes at least two second nodes 500' along its width substantially along the third direction. As compared to the conventional touch substrates, the present touch substrate includes at least two second nodes 500' even in its narrowest portions, resulting in a decreased resistance and much enhanced touch accuracy.

Various appropriate materials may be used for making the first mesh electrode layer and the second mesh electrode layer. Examples of transparent conductive materials suitable for making the first mesh electrode layer and the second meth electrode layer include, but are not limited to, a metal mesh, a silver nano wire, a carbon nano tube, a nano mesh, graphene, and conductive polymers such as poly(3,4-ethylenedioxythiophene) polystyrene sulfonate (PEDOT:PSS). Optionally, the mesh electrode layer is made of a metal mesh such as a nano-silver mesh.

Various appropriate mesh patterns may be used for making the first mesh electrode layer and the second mesh electrode layer. Examples of appropriate mesh patterns include, but are not limited to, grid (tetragonal), triangular, polygonal, square, circular and elliptical. The first mesh electrode layer may have one or more first mesh pattern and the second mesh electrode layer may have one or more second mesh pattern. Optionally, the first mesh pattern is the same as the second mesh pattern. In some embodiments, the mesh pattern includes a plurality of first mesh wires and a plurality of second mesh wires crossing each other. Optionally, the plurality of first mesh wires and the plurality of second mesh wires perpendicularly cross each other.

Various appropriate mesh aperture ratios, mesh line widths, mesh line thicknesses, and opening widths may be used for making the first mesh electrode layer and the second mesh electrode layer. The mesh aperture ratios, mesh line widths, mesh line thicknesses, and opening widths may be selected to achieve optimal electrical conductivity and low resistance.

In some embodiments, the touch substrate further includes a black matrix in the peripheral area of the touch substrate. The black matrix may be made of a black material such as a metal or metal oxide (e.g., chromium or chromium oxide), and a pigment-containing resin, etc.

In some embodiments, the touch substrate further includes a plurality of first touch signal lines connected to the plurality rows of first mesh electrodes and a plurality of second touch signal lines connected to the plurality of columns of second mesh electrodes. Optionally, the plurality of first touch signal lines and the plurality of second touch signal lines are disposed in the peripheral area (e.g., the black matrix area).

In another aspect, the present disclosure provides a touch control display panel having a touch substrate described herein. Optionally, the touch control display panel is a self-capacitive touch control display panel. Optionally, the touch control display panel is a mutual capacitive touch control display panel. Optionally, the touch control display panel is an on-cell touch panel. Optionally, the touch control display panel is an add-on type touch panel. Optionally, the touch control display panel is a one-glass-solution type touch panel. Optionally, the touch control display panel is a glass-film-film type touch panel. Optionally, the touch control display panel is an in-cell touch panel.

In another aspect, the present disclosure provides a touch control display apparatus. Examples of appropriate touch control display apparatuses include, but are not limited to, an electronic paper, a mobile phone, a tablet computer, a television, a monitor, a notebook computer, a digital album, a GPS, etc.

In another aspect, the present disclosure provides a method of fabricating a touch substrate. In some embodiments, the method includes first forming a first initial mesh electrode layer on a base substrate. For example, the first initial mesh electrode layer may be a mesh electrode layer substantially throughout the base substrate, in which the conductive channels have not been formed. To form the conductive channels, the method in some embodiments further includes patterning the first initial mesh electrode layer using a first mask plate to form a first mesh electrode layer including a plurality of first mesh electrodes. The first mask plate includes a plurality of first lightproof regions corresponding to the plurality of first mesh electrodes, the plurality of first lightproof regions arranged substantially along a first direction, each of the plurality of first lightproof regions extending substantially along a second direction.

Each of the plurality of first lightproof regions includes a plurality of first zig zag portions. A midline of each of the plurality of first zig zag portions is a zig zag line. Optionally, the first direction is substantially perpendicular to the second direction.

Figure 10:
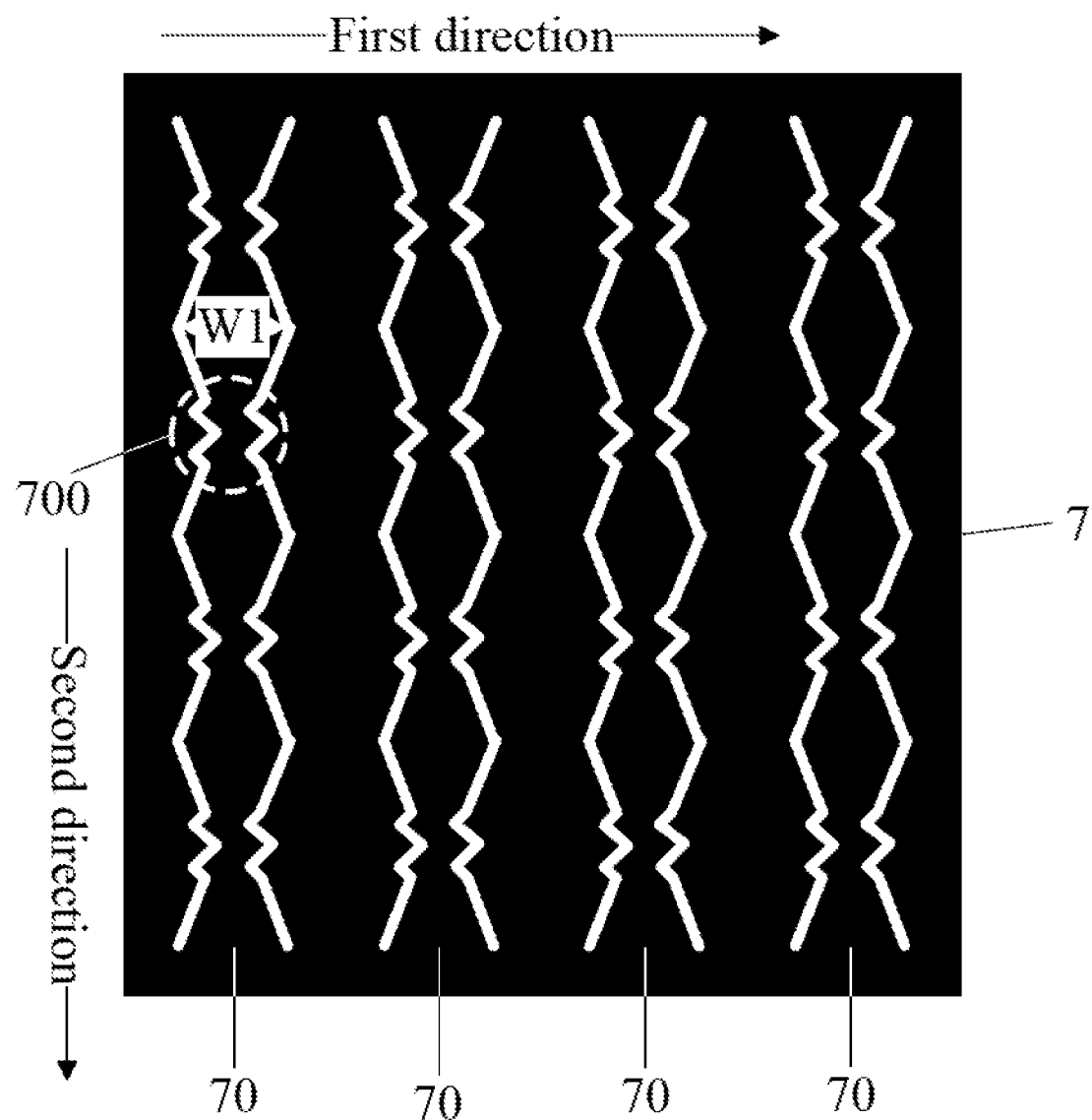
FIG. 10 is a schematic diagram illustrating the structure of a first mask plate having a plurality of first lightproof regions in some embodiments according to the present disclosure.
Figure 11:
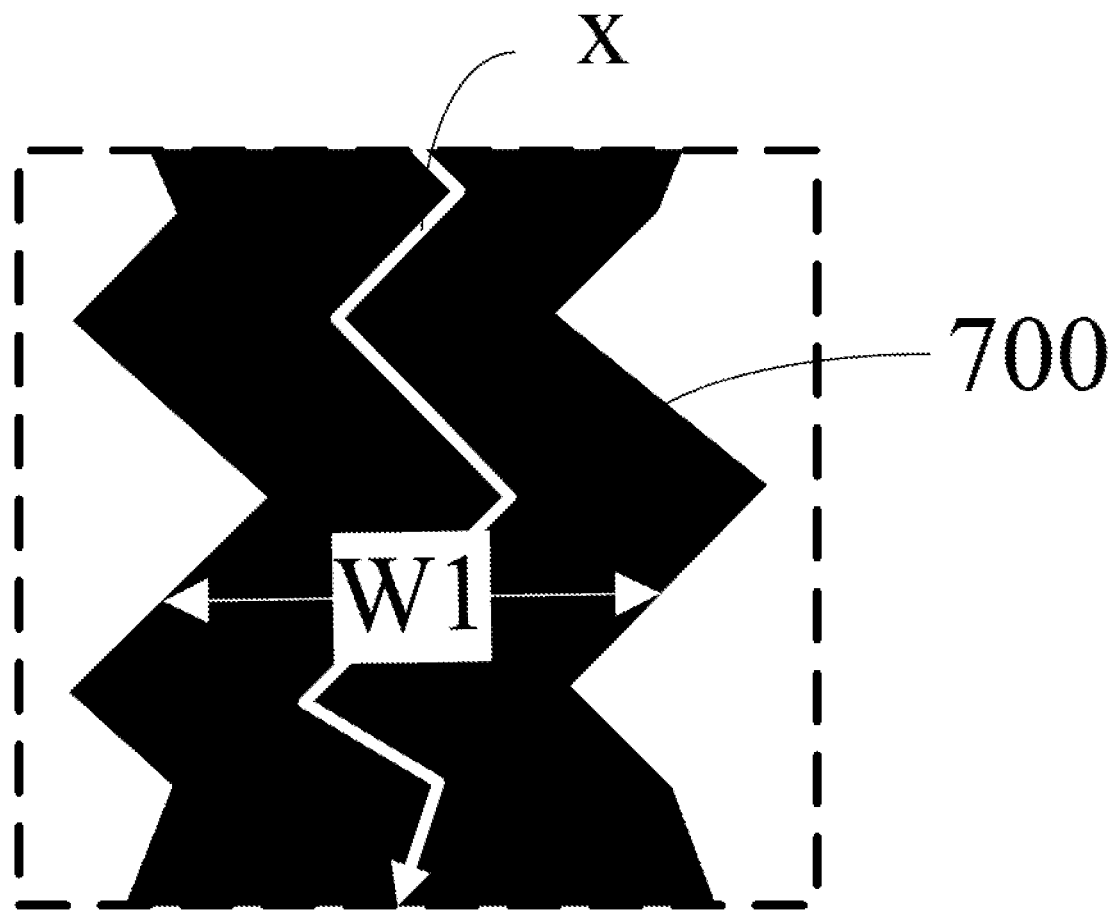
FIG. 11 is a schematic diagram illustrating the structure of a first zig zag portion of the first mask plate in some embodiments according to the present disclosure.

FIG. 10 is a schematic diagram illustrating the structure of a first mask plate having a plurality of first lightproof regions in some embodiments according to the present disclosure. FIG. 11 is a schematic diagram illustrating the structure of a first zig zag portion of the first mask plate in some embodiments according to the present disclosure. Referring to FIG. 10, the first mask plate 7 in some embodiments includes a plurality of first lightproof regions 70 corresponding to the plurality of first mesh electrodes. The plurality of first lightproof regions 70 are arranged substantially along a first direction, each of the plurality of first lightproof regions 70 extends substantially along a second direction. As shown in FIG. 10, each of the plurality of first lightproof regions 70 includes a plurality of first zig zag portions 700. Referring to FIG. 11, a midline x of each of the plurality of first zig zag portions 700 is a zig zag line.

Referring to FIG. 10 and FIG. 11, a width W1 substantially along the first direction of each of the plurality of first lightproof regions 70 varies across its length substantially along the second direction. Each of the plurality of first zig zag portions 700 has a width W1 substantially along the first direction smaller than those of its adjacent portions. Optionally, the plurality of first zig zag portions 700 are narrowest portions substantially along the first direction of each of the plurality of first lightproof regions 70 across its length substantially along the second direction. As discussed above in the context of the first meth electrode layer in the touch substrate, in some embodiments, each of the plurality of first mesh electrodes is formed to comprise a plurality of strands of wires interconnected at a plurality of first nodes. The width W1 of each of the plurality of first zig zag portions 700 substantially along the first direction is defined so that the first mesh electrode layer (formed using the first mask plate 7) includes at least two first nodes substantially, along the first, direction in areas corresponding to each of the plurality of first zig zag portions 700.

In some embodiments, the method further includes forming an insulating layer on a side of the first mesh electrode layer distal to the base substrate; and forming a second initial mesh electrode layer on a side of the insulating layer distal to the first mesh electrode layer. For example, the second initial mesh electrode layer may be a mesh electrode layer substantially throughout the base substrate, in which the conductive channels have not been formed. To form the conductive channels in the second initial mesh electrode layer, the method in some embodiments further includes patterning the second initial mesh electrode layer using a second mask plate to form a second mesh electrode layer including a plurality of second mesh electrodes. The second mask plate includes a plurality of second lightproof regions corresponding to the plurality of second mesh electrodes, the plurality of second lightproof regions arranged substantially along a third direction, each of the plurality of second lightproof regions extending substantially along a fourth direction. Each of the plurality of second lightproof regions includes a plurality of second zig zag portions. A midline of each of the plurality of second zig zag portions is a zig zag line. Optionally, the third direction is substantially perpendicular to the fourth direction.

Figure 12:
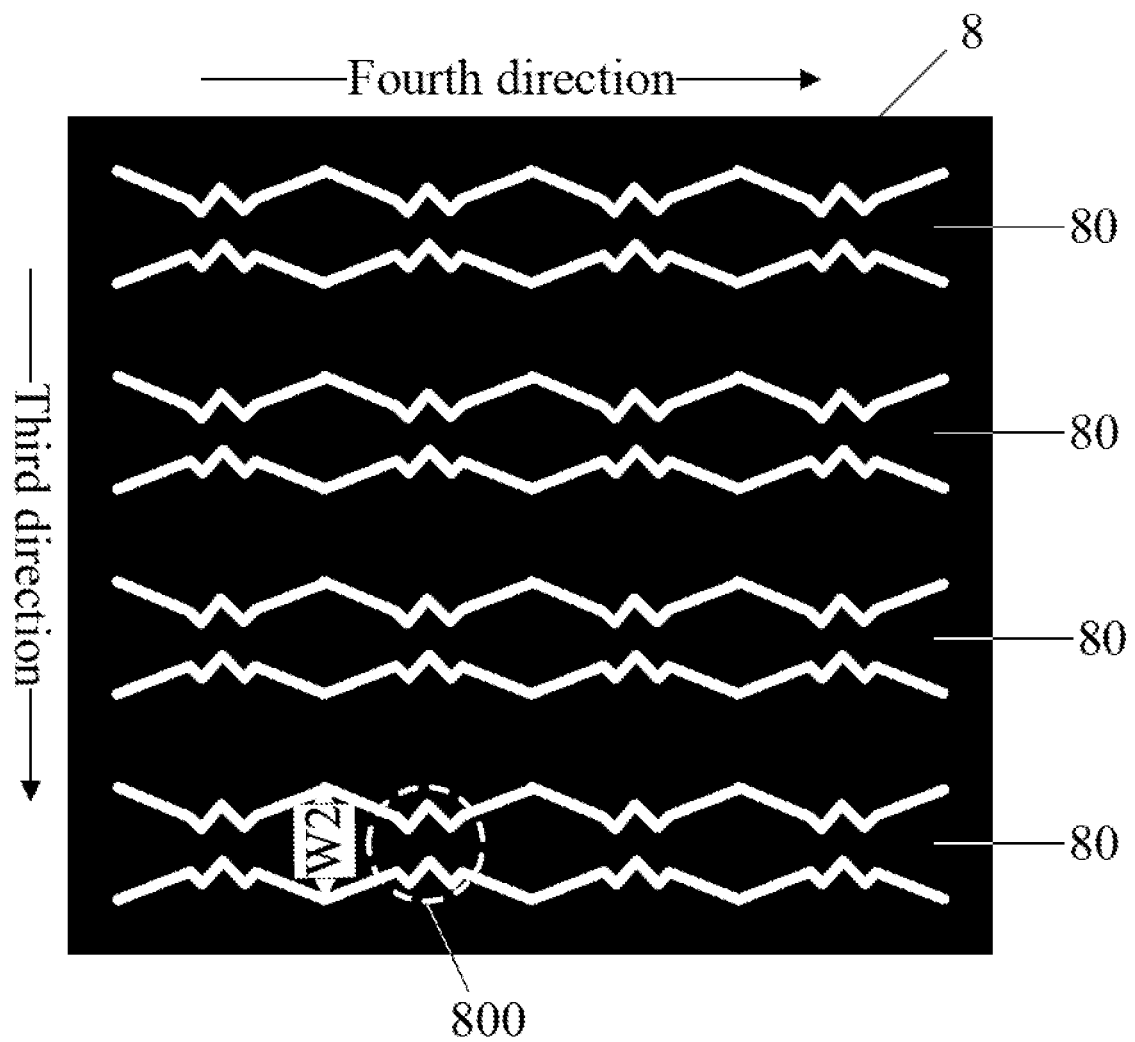
FIG. 12 is a schematic diagram illustrating the structure of a second mask plate having a plurality of second lightproof regions in some embodiments according to the present disclosure.
Figure 13:
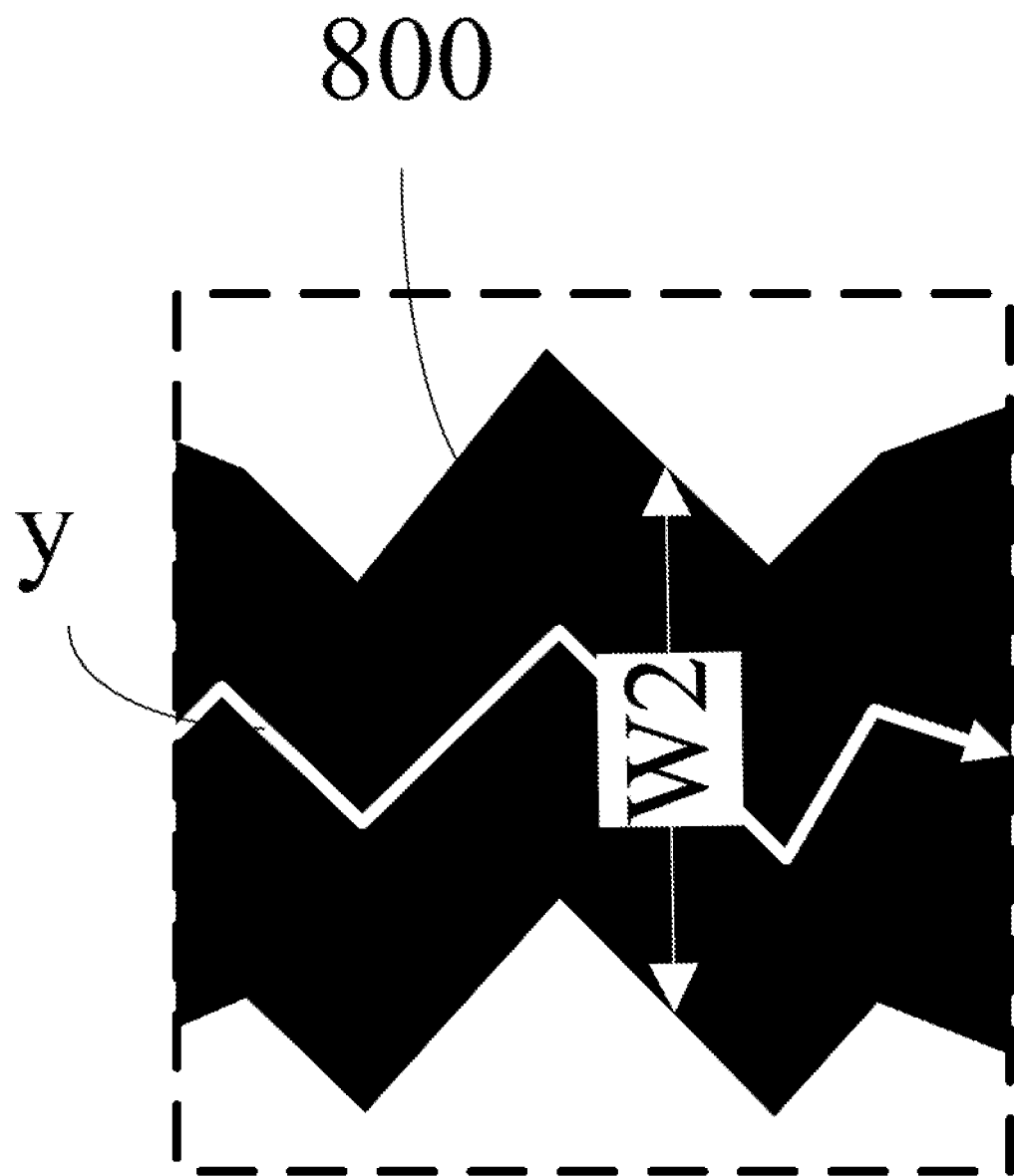
FIG. 13 is a schematic diagram illustrating the structure of a second zig zag portion of the second mask plate in some embodiments according to the present disclosure.

FIG. 12 is a schematic diagram illustrating the structure of a second mask plate having a plurality of second lightproof regions in some embodiments according to the present disclosure. FIG. 13 is a schematic diagram illustrating the structure of a second zig zag portion of the second mask plate in some embodiments according to the present disclosure. Referring to FIG. 12, the second mask plate 8 in some embodiments includes a plurality of second lightproof regions 80 corresponding to the plurality of second mesh electrodes. The plurality of second lightproof regions 80 are arranged substantially along a third direction, each of the plurality of second lightproof regions 80 extends substantially along a fourth direction. As shown in FIG. 12, each of the plurality of second lightproof regions 80 includes a plurality of second zig zag portions 800. Referring to FIG. 13, a midline y of each of the plurality of second zig zag portions 800 is a zig zag line.

Referring to FIG. 12 and FIG. 13, a width W2 substantially along the third direction of each of the plurality of second lightproof regions 80 varies across its length substantially along the fourth direction. Each of the plurality of second zig zag portions 800 has a width W2 substantially along the third direction smaller than those of its adjacent portions. Optionally, the plurality of second zig zag portions 800 are narrowest portions substantially along the third direction of each of the plurality of second lightproof regions 80 across its length substantially along the fourth direction. As discussed above in the context of the second mesh electrode layer in the touch substrate, in some embodiments, each of the plurality of second mesh electrodes is formed to comprise a plurality of strands of wires interconnected at a plurality of second nodes. The width W2 of each of the plurality of second zig zag portions 800 substantially along the third direction is defined so that the second mesh electrode layer (formed using the second mask plate 8) includes at least two second nodes substantially along the third direction in areas corresponding to each of the plurality of second zig zag portions 800.

In some embodiments, the plurality of first mesh electrodes and the plurality of second mesh electrodes are formed to cross over each other forming a plurality of intersections, projections of the plurality of first mesh electrodes and the plurality of second mesh electrodes on the base substrate overlapping with each other in the plurality of intersections. Optionally, a projection of each of the plurality of first zig zag portions on the base substrate covers that of one of the plurality of intersections. Optionally, a projection of each of the plurality of second zig zag portions on the base substrate covers that of one of the plurality of intersections.

Optionally, the third direction is substantially perpendicular to the first direction. Optionally, the third direction is substantially parallel to the second direction. Optionally, the fourth direction is substantially perpendicular to the second direction. Optionally, the fourth direction is substantially parallel to the first direction.

In another aspect, the present disclosure provides a mask plate. In some embodiments, the mask plate includes a plurality of lightproof regions corresponding to the plurality of mesh electrodes, the plurality of lightproof regions arranged substantially along a first direction, each of the plurality of lightproof regions extending substantially along a second direction. Optionally, the first direction is substantially perpendicular to the second direction. Optionally, each of the plurality of lightproof regions includes a plurality of zig zag portions, a midline each of the plurality of zig zag portions being a zig zag line.

Optionally, a width substantially along the first direction of each of the plurality of lightproof regions varies across its length substantially along the second direction; and each of the plurality of zig zag portions has a width substantially along the first direction smaller than those of its adjacent portions. Optionally, the plurality of zig zag portions are narrowest portions substantially along the first direction of each of the plurality of lightproof regions across its length substantially along the second direction.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the teem "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate, comprising:
   a base substrate; and
   a first mesh electrode layer comprising a plurality of first mesh electrodes on the base substrate, the plurality of first mesh electrodes arranged substantially along a first direction, each of the plurality of first mesh electrodes extending substantially along a second direction;
   a second mesh electrode layer comprising a plurality of second mesh electrodes, the plurality of second mesh electrodes arranged substantially along a third direction, each of the plurality of second mesh electrodes extending substantially along a fourth direction;
   wherein the touch substrate comprises a plurality of local zig zag structures limited in a plurality of local regions, respectively, a respective local zig zag structure comprising a respective first portion from the plurality of first mesh electrodes and a respective second portion from the plurality of second mesh electrodes, an orthographic projection of the respective first portion on the base substrate at least partially overlaps with an orthographic projection of the respective second portion on the base substrate;
   wherein, limited in a respective local region of the plurality of local regions, a first zig zag contour along a first boundary and a second zig zag contour along a second boundary of the respective first portion are co-directional and parallel to each other, the first zig zag contour and the second zig zag contour being arranged along the first direction;
   limited in a respective local region of the plurality of local regions, a third zig zag contour along a third boundary and a fourth zig zag contour along a fourth boundary of the respective second portion are co-directional and parallel to each other, the third zig zag contour and the fourth zig zag contour being arranged along the third direction; and
   wherein, limited in a respective local region of the plurality of local regions,
   a first virtual central line of the respective first portion is a zig zag line, the first virtual central line being equidistant to the first zig zag contour and to the second zig zag contour;
   the first zig zag contour, the first virtual central line, and the second zig zag contour are co-directional and parallel to each other;
   a second virtual central line of the respective second portion is a zig zag line, the second virtual central line being equidistant to the third zig zag contour and to the fourth zig zag contour; and
   the third zig zag contour, the second virtual central line, and the fourth zig zag contour are co-directional and parallel to each other.

2. The touch substrate of claim 1, wherein a width substantially along the first direction of each of the plurality of first mesh electrodes varies across its length substantially along the second direction;
   a respective first mesh electrode of the plurality of first mesh electrodes comprises a plurality of first portions respectively in the plurality of local regions; and
   each of the plurality of first portions has a width substantially along the first direction smaller than those of its adjacent portions.

3. The touch substrate of claim 1, wherein a width substantially along the first direction of each of the plurality of first mesh electrodes varies across its length substantially along the second direction;
   a respective first mesh electrode of the plurality of first mesh electrodes comprises a plurality of first portions respectively in the plurality of local regions; and
   the plurality of first portions are narrowest portions substantially along the first direction of each of the plurality of first mesh electrodes across its length substantially along the second direction.

4. The touch substrate of claim 1, wherein each of the plurality of first mesh electrodes comprises a plurality of strands of wires interconnected at a plurality of first nodes; and
   the respective first portion comprises at least two first nodes along its width substantially along the first direction.

5. The touch substrate of claim 4, wherein the respective first portion comprises only two first nodes at its narrowest part along its width substantially along the first direction.

6. The touch substrate of claim 1, further comprising:
   an insulating layer on a side of the first mesh electrode layer distal to the base substrate, the insulating layer being between the first mesh electrode layer and the second mesh electrode layer; and
   the plurality of first mesh electrodes and the plurality of second mesh electrodes cross over each other forming a plurality of intersections, projections of the plurality of first mesh electrodes and the plurality of second mesh electrodes on the base substrate overlapping with each other in the plurality of intersections.

7. The touch substrate of claim 6, wherein the respective first portion comprises at least a part in one of the plurality of intersections.

8. The touch substrate of claim 6, wherein the first direction is substantially perpendicular to the third direction, and the second direction is substantially perpendicular to the fourth direction.

9. The touch substrate of claim 6, wherein a width substantially along the third direction of each of the plurality of second mesh electrodes varies across its length substantially along the fourth direction; and
a respective second mesh electrode of the plurality of second mesh electrodes comprises a plurality of second portions respectively in the plurality of local regions; and
each of the plurality of second portions has a width substantially along the third direction smaller than those of its adjacent portions.

10. The touch substrate of claim 6, wherein a width substantially along the third direction of each of the plurality of second mesh electrodes varies across its length substantially along the fourth direction;
a respective second mesh electrode of the plurality of second mesh electrodes comprises a plurality of second portions respectively in the plurality of local regions; and
the plurality of second portions are narrowest portions substantially along the third direction of each of the plurality of second mesh electrodes across its length substantially along the fourth direction.

11. The touch substrate of claim 6, wherein each of the plurality of second mesh electrodes comprises a plurality of strands of wires interconnected at a plurality of second nodes;
the respective second portion comprises at least two second nodes along its width substantially along the third direction.

12. The touch substrate of claim 6, wherein the respective second portion comprises at least a part in one of the plurality of intersections.

13. A touch control display panel, comprising the touch substrate of claim 1.

14. A method of fabricating a touch substrate, comprising:
forming a first initial mesh electrode layer on a base substrate;
patterning the first initial mesh electrode layer using a first mask plate to form a first mesh electrode layer comprising a plurality of first mesh electrodes;
forming an insulating layer on a side of the first mesh electrode layer distal to the base substrate;
forming a second initial mesh electrode layer on a side of the insulating layer distal to the first mesh electrode layer; and
patterning the second initial mesh electrode layer using a second mask plate to form a second mesh electrode layer comprising a plurality of second mesh electrodes;
wherein the first mask plate comprising a plurality of first light-blocking regions corresponding to the plurality of first mesh electrodes, the plurality of first light-blocking regions arranged substantially along a first direction, each of the plurality of first light-blocking regions extending substantially along a second direction; and
a respective first light-blocking region of the plurality of first light-blocking regions comprises a plurality of first zig zag portions;

wherein the second mask plate comprising a plurality of second light-blocking regions corresponding to the plurality of second mesh electrodes, the plurality of second light-blocking regions arranged substantially along a third direction, each of the plurality of second light-blocking regions extending substantially along a fourth direction; and
a respective second light-blocking region of the plurality of second light-blocking regions comprises a plurality of second zig zag portions;
wherein the touch substrate is formed to comprise a plurality of local zig zag structures limited in a plurality of local regions, respectively, a respective local zig zag structure comprising a respective first portion from the plurality of first mesh electrodes and a respective second portion from the plurality of second mesh electrodes, an orthographic projection of the respective first portion on the base substrate at least partially overlaps with an orthographic projection of the respective second portion on the base substrate;
wherein, limited in a respective local region of the plurality of local regions, a first zig zag contour along a first boundary and a second zig zag contour along a second boundary of the respective first portion are co-directional and parallel to each other, the first zig zag contour and the second zig zag contour being arranged along the first direction; and
limited in a respective local region of the plurality of local regions, a third zig zag contour along a third boundary and a fourth zig zag contour along a fourth boundary of the respective second portion are co-directional and parallel to each other, the third zig zag contour and the fourth zig zag contour being arranged along the third direction; and
wherein, limited in a respective local region of the plurality of local regions,
a first virtual central line of the respective first portion is a zig zag line, the first virtual central line being equidistant to the first zig zag contour and to the second zig zag contour;
the first zig zag contour, the first virtual central line, and the second zig zag contour are co-directional and parallel to each other;
a second virtual central line of the respective second portion is a zig zag line, the second virtual central line being equidistant to the third zig zag contour and to the fourth zig zag contour; and
the third zig zag contour, the second virtual central line, and the fourth zig zag contour are co-directional and parallel to each other.

15. The method of claim 14, wherein a width substantially along the first direction of each of the plurality of first light-blocking regions varies across its length substantially along the second direction; and
each of the plurality of first zig zag portions has a width substantially along the first direction smaller than those of its adjacent portions.

16. The method of claim 15, wherein each of the plurality of first mesh electrodes is formed to comprise a plurality of strands of wires interconnected at a plurality of first nodes; and
the width of each of the plurality of first zig zag portions substantially along the first direction is defined so that the first mesh electrode layer comprises at least two first nodes substantially along the first direction in areas corresponding to each of the plurality of first zig zag portions.

17. The method of claim 14, wherein a width substantially along the third direction of each of the plurality of second light-blocking regions varies across its length substantially along the fourth direction; and each of the plurality of second zig zag portions has a width substantially along the third direction smaller than those of its adjacent portions.

18. The method of claim 14, wherein each of the plurality of second mesh electrodes is formed to comprise a plurality of strands of wires interconnected at a plurality of second nodes; and the width of each of the plurality of second zig zag portions substantially along the third direction is defined so that the second mesh electrode layer comprises at least two second nodes substantially along the third direction in areas corresponding to each of the plurality of second zig zag portions.

19. The method of claim 14, wherein the plurality of first mesh electrodes and the plurality of second mesh electrodes are formed to cross over each other forming a plurality of intersections, projections of the plurality of first mesh electrodes and the plurality of second mesh electrodes on the base substrate overlapping with each other in the plurality of intersections;

a projection of each of the plurality of first zig zag portions on the base substrate covers that of one of the plurality of intersections; and a projection of each of the plurality of second zig zag portions on the base substrate covers that of one of the plurality of intersections.

\* \* \* \* \*